United States Patent [19] [11] 4,015,024
Horman et al. [45] Mar. 29, 1977

[54] AROMATIZING TEA WITH GERANYL ACETONE AND δ-DECALACTONE

[75] Inventors: Ian Horman, Corseaux; Paul Cazenave, Chavornay, both of Switzerland

[73] Assignee: Societe d'Assistance Technique pour Produits Nestle S.A., La Tour-de-Peilz, Switzerland

[22] Filed: Nov. 7, 1975

[21] Appl. No.: 629,979

Related U.S. Application Data

[62] Division of Ser. No. 519,627, Oct. 31, 1974, abandoned.

[30] Foreign Application Priority Data

Nov. 23, 1973 Switzerland .................. 16515/73

[52] U.S. Cl. .................. 426/536; 426/533; 426/597

[51] Int. Cl.$^2$ .................. A23F 3/00; A23L 1/221; A23L 1/226

[58] Field of Search .......... 426/597, 534, 536, 538

[56] References Cited

UNITED STATES PATENTS

| | | |
|---|---|---|
| 3,634,098 | 1/1972 | Rhoades et al. .................. 426/534 |
| 3,634,101 | 1/1972 | Rhoades et al. .................. 426/534 |
| 3,645,755 | 2/1972 | Sakato et al. .................. 426/597 X |
| 3,676,156 | 7/1972 | Bentz .................. 426/597 X |
| 3,702,253 | 11/1972 | Winter .................. 426/597 |
| 3,911,145 | 10/1975 | Marion .................. 426/597 |

FOREIGN PATENTS OR APPLICATIONS

| | | | |
|---|---|---|---|
| 4,617,957 | 2/1973 | Japan .................. | 426/597 |
| 1,306,017 | 2/1973 | United Kingdom .................. | 426/597 |

OTHER PUBLICATIONS

Perfume & Flavor Chemicals, Arctawder, 1969, No. 1432.
Fenaroli's Hnbk. of Flavor Ingredients, Chemical Rubber Co., 1971, p. 353.
J. Agr. Food Chem., vol. 15, No. 1, Jan.–Feb. 1967, pp. 36–47.
Agr. Biol. Chem., vol. 31, No. 11, pp. 1265–1269 (1967).
Agr. Biol. Chem., vol. 32, No. 3, pp. 379–386 (1968).
Helvetica Chimica Acta, vol. 57, Fasc. 1(1974), nr 23–24, pp. 206–208 & nr 24–25, pp. 209–211 (11/23/73 & 12/20/73).

*Primary Examiner*—Steven L. Weinstein
*Attorney, Agent, or Firm*—Kenyon & Kenyon Reilly Carr & Chapin

[57] ABSTRACT

A flavoring agent is provided for a tea composition to impart various flavors. The flavoring agent consisting essentially of geranyl acetone and δ-decalactone in a ratio of 1:1 to 1:2 and is used in an amount of 0.5 to 9 ppm of δ-decalactone based on the soluble tea solids.

4 Claims, No Drawings

AROMATIZING TEA WITH GERANYL ACETONE AND δ-DECALACTONE

This is a division of application Ser. No. 519,627 filed Oct. 31, 1974, now abandoned.

This invention relates to the aromatising of beverages. More particularly, the invention is concerned with strengthening the aroma of tea in beverages based on tea.

Instant teas are generally prepared by extracting black tea leaves followed by concentration and, if desired, drying. During these operations, however, a large part of the volatile substances responsible for flavour is lost. In some cases, they can be recovered by condensation and then re-incorporated in the tea extract. In most cases, however, the aforementioned volatile substances have undergone changes which make them unsuitable for re-incorporation. In cases such as these, it may be advisable to aromatise the extract with suitable compositions.

British Patent Specification 1,306,017 describes certain compositions used as aroma strengtheners in tea for imparting a note of freshness. These compositions are mostly based on compounds whose presence in the aroma of tea is well known. In addition, they are frequently highly complex. The compositions are added to modify or restore tea flavor and aroma.

The present invention relates to a process for aromatising a beverage based on tea, that is, to a process of enhancing tea flavor. The process is distinguished by the fact that an aromatising agent composed of geranyl acetone and δ-decalactone is added to the beverage.

In the context of the invention, a tea based beverage, apart of course from the conventional infusion of tea leaves, may be any of the beverages known as "instant teas" which are aqueous solutions of aromas and soluble tea extracts, especially solids, capable of additionally containing various additives, such as citric acid for example. In this case, the term beverage as used in the context of the invention applies both to the liquid reconstituted beverage and also to the extract of the solids before or after drying, which means that the aromatising agent may be added before, during or after reconstitution of the liquid beverage by the addition of water. Thus, although the quantities specified hereinafter are expressed in terms of weight with reference to the soluble solids of the tea, this does not imply that the aromatising agent is added to the solids themselves. It is merely one convenient method of presentation, because the addition can be made for example either to the extract of the solids before drying or to the reconstituted liquid beverage.

It should be pointed out that, although geranyl acetone on its own is not a very interesting aromatising agent in view of its terpenic aromatic note and its bitter flavour, its entire interest is as a constituent of aromatising compositions. Thus, the following compositions:

| geranyl acetone | 1 part |
|---|---|
| δ-decalactone | 1 to 2 parts | provide the tea-based beverage with a balanced aroma, although bitterness reappears with greater relative proportions of geranyl acetone. These compositions have to be added in quantities corresponding to quantities of δ-decalactone of from 0.5 to 9 ppm, preferably from 1 to 6 ppm, based on the solids in the tea.

A preferred beverage is the following:

| geranyl acetone | 1.5 part |
|---|---|
| δ-decalactone | 3 parts |
| soluble tea solids | 1 000 000 parts |

The process according to the invention can be carried out in many different ways.

In a first embodiment, an infusion of tea or a liquid reconstituted tea in any concentration, hot or cold, is treated with an aromatising agent. To this end, the aromatising agent may be directly added or, where it is a composition, its constituents may be added either individually or in combination, after which the whole is homogenised. The same procedure can of course be adopted for a liquid extract of tea solids intended, after drying, to give an instant tea powder. Since the aromatising agent on the one hand is relatively simple and, on the other hand, consists of stable, substantially non-volatile substances, the increase in temperature which may occur during drying does not have any serious disadvantages. In one preferred modification of this first embodiment, the aromatising agent or its constituents are added not as such but in solution or emulsion in a diluent, the quantities of aromatising agent to be incorporated in the beverage being proportionally very small and, where the volume of this beverage is reduced, so small as to allow any dosage. It is preferred to use a so-called "foot-grade" diluent, for example water or an aqueous alcoholic solution.

A second embodiment of the process according to the invention comprises treating a solid tea extract, for example in powder form. In a first modification of this embodiment, the aromatising agent is added directly to the powder, followed by homogenisation, for example in a rotary cylinder. In another modification, designed for aromatising compositions, the constituents of the composition may be added either individually or in combination, followed by homogenisation. In another preferred modification, the aromatising agent is added to a small fraction of the tea powder to be treated, for example 5 to 10%, which facilitates addition, after which this fraction is mixed with the rest of the powder, followed by homogenisation until the aromatising agent is uniformly distributed throughout the powder. In the case of aromatising compositions, it is also possible, in another preferred embodiment of this invention, individually to add each of the constituents to as many small fractions of the tea powder, subsequently to combine all the fractions and the untreated powder and then to homogenise the whole, the aforementioned fractions either being equal in weight or selected in a ratio by weight constant with the quantity of constituent to be added to it, so that each of the fractions is aromatised to the same extent. For the same reasons as those described above, the aromatising agent or its constituents are not added as such in preferred modifications of all these embodiments, but in solution or emulsion in a diluent, preferably a "food-grade" diluent. In this case, it may be that the quantity of diluent used is sufficient to dissolve the fraction of treated tea power. During these treatments, dispersion of the aromatising agent can be facilitated by a slight increase in temperature. Finally, the instant tea is reconstituted, for example, simply by adding water to the powder.

The process according to the invention is illustrated by the following Example wherein the aqueous alcoholic solutions referred to are solutions containing 10% of ethanol, whilst the values expressed in ppm are based on the tea solids.

EXAMPLE 1

3 fractions of an instant tea powder weighing 100 g, 200 g and 1700 g, respectively, are prepared. 10 ml of an aqueous alcoholic solution containing 300 mg per liter of geranyl acetone are added to the 100 g fraction, and 20 ml of an aqueous alcoholic solution containing 300 mg per liter of δ-decalactone (30 ppm) are added to the 200 g fraction. These two fractions are then combined along with the 1700 g fraction of nonaromatised powder. The whole is homogenised. The concentration of δ-decalactone is then 3 ppm. 1% of the aromatised and homogenised powder is then removed and 6.5 liters of hot water added to it, followed by stirring up to dissolution. 9 tasters out of 10 preferred the aromatised tea, describing it as having a very balanced aroma with an agreeably astringent, but non-bitter flavour. For the same level of aromatisation, the gap between the aromastised tea and the reference narrows down if the relative proportion of geranyl acetone decreases, whilst a higher relative proportion of this ketone produces an unpleasant, bitter note.

We claim:
1. An aromatising agent for enhancing soluble tea solids consisting essentially of geranyl acetone and δ-decalactone wherein said geranyl acetone and δ-decalactone are in a ratio of 1:1 to 1:2 relative to each other.

2. A tea composition comprising soluble tea solids and an added aromatising agent consisting essentially of geranyl acetone and δ-decalactone in a ratio of 1:1 to 1:2 relative to each other and with said δ-decalactone being in an amount of 0.5 to 9 ppm of said tea solids.

3. A process for preparing a tea composition, which comprises adding to soluble tea solids an aromatising agent consisting essentially of geranyl acetone and δ-decalactone wherein said aromatising agent has the following composition:

| | |
|---|---|
| geranyl acetone | 1 part |
| δ-decalactone | 1 to 2 parts | said aromatising agent being added in an amount corresponding to an amount of δ-decalactone of from 0.5 to 9 ppm, based on the soluble tea solids.

4. A process as claimed in claim 3, in which the aromatising agent is added to a liquid or solid tea extract.

* * * * *